US012533588B2

(12) United States Patent
Hagdahl et al.

(10) Patent No.: US 12,533,588 B2
(45) Date of Patent: Jan. 27, 2026

(54) TECHNIQUES FOR ASSISTED GAMEPLAY USING GEOMETRIC FEATURES

(71) Applicant: Electronic Arts Inc., Redwood City, CA (US)

(72) Inventors: Joakim Hagdahl, Langley (CA); Daniel Herdman, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 363 days.

(21) Appl. No.: 18/194,328

(22) Filed: Mar. 31, 2023

(65) Prior Publication Data

US 2024/0325917 A1 Oct. 3, 2024

(51) Int. Cl.

| | |
|---|---|
| ***A63F 13/577*** | (2014.01) |
| ***A63F 13/55*** | (2014.01) |
| ***A63F 13/573*** | (2014.01) |
| ***A63F 13/60*** | (2014.01) |
| ***A63F 13/63*** | (2014.01) |

(52) U.S. Cl.

CPC ............ *A63F 13/577* (2014.09); *A63F 13/55* (2014.09); *A63F 13/573* (2014.09); *A63F 13/60* (2014.09); *A63F 13/63* (2014.09)

(58) Field of Classification Search

CPC ........ A63F 13/55; A63F 13/577; A63F 13/63; A63F 13/60; A63F 13/573

See application file for complete search history.

(56) References Cited

U.S. PATENT DOCUMENTS

| | | | | |
|---|---|---|---|---|
| 6,961,055 B2 * | 11/2005 | Doak | ...................... | A63F 13/63 345/677 |
| 9,259,646 B2 * | 2/2016 | Kudo | ...................... | A63F 13/45 |
| 11,878,249 B2 * | 1/2024 | Gisslén | ................... | A63F 13/70 |
| 2003/0058238 A1 * | 3/2003 | Doak | ...................... | A63F 13/45 709/217 |
| 2005/0075154 A1 * | 4/2005 | Bordes | .................... | A63F 13/45 463/1 |
| 2007/0182732 A1 * | 8/2007 | Woop | ...................... | G06T 15/06 345/419 |
| 2011/0213716 A1 * | 9/2011 | Ocko | ...................... | A63F 13/30 705/304 |
| 2013/0064456 A1 * | 3/2013 | Kudo | ...................... | A63F 13/45 382/195 |
| 2013/0120385 A1 * | 5/2013 | Krishnaswamy | ....... | G06T 15/50 345/426 |
| 2014/0340403 A1 * | 11/2014 | Droske | ................... | G06T 15/06 345/426 |

(Continued)

*Primary Examiner* — William H Mcculloch, Jr.

(74) *Attorney, Agent, or Firm* — Lee & Hayes, P.C.

(57) ABSTRACT

The techniques described herein include using a system for enabling assisted gameplay in a computer game using real-time detection of predefined scene features and mapping of the detected features to recommended actions. For example, the system may generate a scanning query (e.g., a segment cast) toward a target area within a virtual scene, determine a geometric feature based on the scanning query, determine a scene feature based on the geometric feature, determine an action associated with the scene feature, and control an avatar based on the action. Examples of scene features that may have mappings to recommended actions include obstacles within a predicted trajectory of the avatar and transitions in the ground level of the virtual scene.

20 Claims, 8 Drawing Sheets

(56) References Cited

U.S. PATENT DOCUMENTS

| | | | | |
|---|---|---|---|---|
| 2015/0375101 | A1* | 12/2015 | George | A63F 13/497 463/24 |
| 2022/0036118 | A1* | 2/2022 | Gupta | G06V 10/145 |
| 2022/0305386 | A1* | 9/2022 | Gisslén | A63F 13/60 |
| 2023/0338854 | A1* | 10/2023 | Wang | G06T 13/40 |
| 2023/0343019 | A1* | 10/2023 | Wald | G06T 15/06 |
| 2024/0325917 | A1* | 10/2024 | Hagdahl | A63F 13/577 |
| 2024/0325921 | A1* | 10/2024 | Hagdahl | A63F 13/55 |

* cited by examiner

300

400

600

TECHNIQUES FOR ASSISTED GAMEPLAY USING GEOMETRIC FEATURES

BACKGROUND

Computer games have become increasingly popular over the past few decades, with millions of players worldwide enjoying a variety of games across different platforms. As the complexity and realism of computer games have increased, so have the challenges faced by players in navigating and interacting with virtual environments. Players often encounter obstacles and hazards that require quick reflexes and accurate judgment to overcome, leading to frustration and dissatisfaction. There is a need for systems that efficiently and effectively provide real-time assistance to players, enabling them to make better decisions and achieve their in-game objectives more efficiently.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
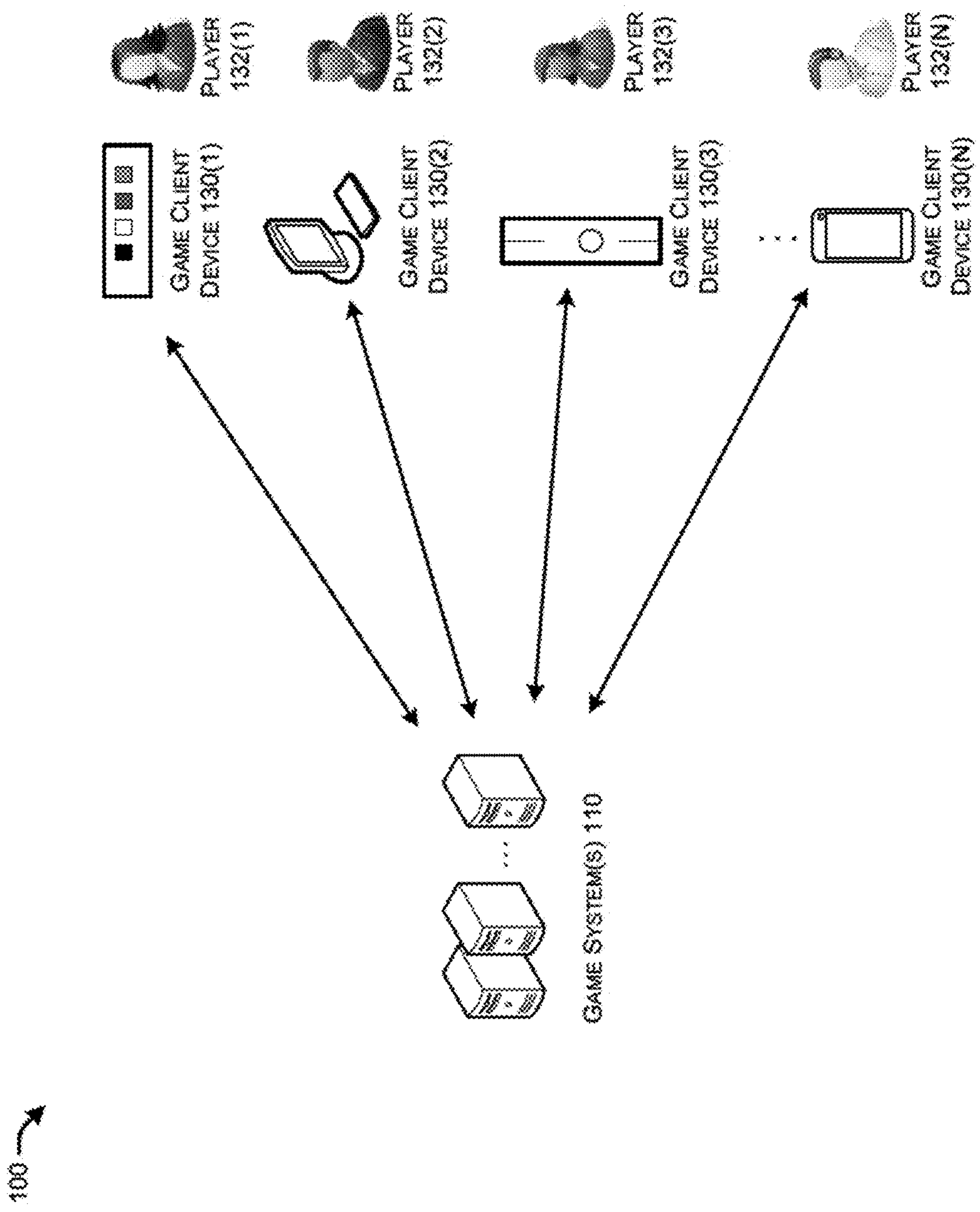
FIG. 1 illustrates a schematic diagram of an example environment with game system(s) and game client device(s).

Example embodiments of this disclosure describe methods, apparatuses, computer-readable media, and system(s) for enabling assisted gameplay for a computer game. More particularly, example methods, apparatuses, computer-readable media, and system(s) according to this disclosure may allow real-time detection of predefined scene features, mapping of the detected scene features to recommended actions, and controlling player avatars based on the recommended actions.

For example, an example system (e.g., a game system or a game client device) can generate a scanning query (e.g., a segment cast) toward a target area within a virtual scene, determine a geometric feature based on the scanning query, determine a scene feature based on the geometric feature, determine an action associated with the scene feature, and control an avatar based on the action. A geometric feature may include a shape of an object, a concave transition in a ground level of the virtual scene, a convex transition in the ground level, and a step-wise transition in the ground level. While the present disclosure provides examples of geometric features and example embodiments that determine techniques for assisted gameplay using geometric features, the examples are provided for illustrative purposes only and do not define or narrow claim scope. Examples of scene features that may have mappings to recommended actions include obstacles in a region within a predicted trajectory of the avatar and transitions in the ground level of the virtual scene.

In some cases, the techniques described herein relate to using a scanning query to determine a geometric feature in a virtual scene. A scanning query may be any computer graphics operation configured to determine at least one geometric feature associated with an object in a target area of the virtual scene. Examples of scanning queries include a ray cast, a query that includes a collection of ray casts, and a segment cast.

A ray cast may represent a ray in the virtual scene cast from an initial point in the virtual scene as a straight line with a particular direction. Once cast, the ray cast may return the coordinates associated with the first intersection of the ray cast with an object in the virtual scene. In some cases, because a ray cast includes a single line and can thus represent a single intersection point, the ray cast is not a good tool for determining geometric features in the virtual scene.

The example system may use at least one of a collection of ray casts or a segment cast to address the shortcomings associated with detecting geometric features using a ray cast. In some cases, the example system may cast a collection of rays, each returning a different intersection point. Because a collection of ray casts returns more intersection points than a single ray cast, the output of the collection is likely to generate more reliable estimates of geometric features in a target area of the virtual scene. However, as the number of rays cast increases, the computational costs of using collection queries also increase, making this approach less scalable and affordable for more advanced graphics processing applications.

A segment cast may be a scanning query configured to return all geometric information in a particular region of the virtual scene. For example, a two-dimensional segment cast may start from an initial line referred to as a half-axis and extend the half-axis in a perpendicular direction (e.g., in a direction parallel to the ground level). As another example, a three-dimensional segment cast may originate from a rectangular region characterized by a first initial line known as a half-axis and a second initial line perpendicular to the half-axis known as a height extrusion axis. The second initial line may be parallel to a line extending along the avatar. In this example, the three-dimensional segment cast extends the rectangular region in a perpendicular direction to both the half-axis and the height extrusion axis (e.g., in a direction parallel to the ground level).

In some cases, the example system may generate one or more segment casts, each associated with (e.g., cast toward) a respective target area within the virtual scene. For example, the example system may generate: (i) a first segment cast toward a first region that includes at least a portion of a line of sight of the player avatar when the line of sight is substantially parallel to the ground level, and (ii) a second segment cast toward a second region that includes at least a portion of the ground level of the virtual scene. In some cases, the first segment cast may capture geometric features corresponding to a region parallel to the head of the player avatar while the avatar stands straight. In contrast, the second segment cast may capture geometric features corresponding to a region parallel to the player avatar's feet while the avatar is on the ground. In some cases, a first execution thread performs the operations corresponding to the first segment cast, a second execution thread performs the operations corresponding to the second segment cast, and the example system executes the two execution threads in parallel.

In some cases, to determine one or more geometric features associated with the virtual scene, the example system generates (e.g., using N respective execution threads executed in parallel) N scanning queries. Each scanning query may return geometric feature data associated with a respective region of the virtual scene. In some cases, a first scanning query may return geometric feature data associated with a first virtual environment region parallel to the player avatar's head. For example, the first virtual environment region may be a two-dimensional plane extending (e.g., in a longitudinal direction and for a predefined distance) from a line that intersects with the avatar's head (e.g., a line that connects the avatar's two eyes) and/or a line associated with a player vantage point in a first-person game. As another example, the first virtual environment region may be a two-dimensional plane extending (e.g., in a longitudinal direction and for a predefined distance) from a line that intersects with the avatar's upper body. As a further example, the first virtual environment region may be a three-dimensional plane extending (e.g., in a longitudinal direction and for a predefined distance) from a two-dimensional plane that intersects with at least a portion of the avatar's upper body.

In some cases, a second scanning query may return geometric feature data associated with a second virtual environment region parallel to the player's avatar feet. For example, the second virtual environment region may be a two-dimensional plane extending (e.g., in a longitudinal direction and for a predefined distance) from a line that intersects with the avatar's feet. As another example, the second virtual environment region may be a two-dimensional plane extending (e.g., in a longitudinal direction and for a predefined distance) from a line that intersects with the avatar's lower body. As a further example, the second virtual environment region may be a three-dimensional plane extending (e.g., in a longitudinal direction and for a predefined distance) from a two-dimensional plane that intersects with at least a portion of the avatar's lower body.

In some cases, a scanning query returns one or more geometric features in a target region of the virtual scene. In some cases, the scanning query may return a geometric feature representing the detected presence of a particular geometric shape in the target region. For example, a scanning query extending along the avatar's head may return a geometric feature representing the detected presence of a cylinder shape in the target region. In some cases, the scanning query may return a geometric feature representing the detected presence of a transition in the ground level of the virtual scene (e.g., a concave or convex transition in the ground level).

Geometric features in a virtual scene that indicate the presence of an obstacle in a region within the predicted trajectory of the avatar may include a variety of characteristics depending on the game's design and the obstacle's specific context. For example, detecting an object having a predefined shape in a target region associated with the avatar's line of sight may indicate the presence of the obstacle in a region within the predicted trajectory of the avatar's context. As another example, if the target region of the virtual scene includes a narrow passage that the avatar must pass through, this may indicate the presence of an obstacle. In some cases, the presence of an obstacle may be indicated by visual cues such as a wall or other solid object that is visible in the virtual scene. Such visual cues can be used to detect a wide variety of obstacles, from physical barriers to environmental hazards such as lava or water.

In addition to detecting the geometric features, the techniques described herein may enable determining scene features in a virtual scene based on the geometric features and mapping the scene features to detected actions. Examples of scene features include obstacles and transitions in the ground level of the virtual scene.

For example, a first scene feature may represent an obstacle that collides with the player avatar's head if the avatar passes through the scene location associated with the obstacle in an upright position. As another example, a second scene feature may represent a hill, a downhill, a hole in the ground such as a skating bowl, or a staircase.

In some cases, the example system may use the detected features to map recommended actions for controlling player avatars. The example system may map detected scene features to recommended actions for controlling the avatar. The example system may use predefined rules to determine the recommended action for each detected scene feature.

For example, if the scanning query detects an obstacle in the path of the player avatar, the example system may recommend that the avatar lowers its head, jumps, or moves to the side to avoid the obstacle. As another example, if the scanning query detects a transition in the ground level, the mapping module may recommend that the avatar adjusts its direction to account for a change in the direction caused by the ground level transition.

In some embodiments, after determining a recommended action, the example system generates control signals that move the avatar based on the recommended action. For example, if the recommended action is to jump, the example system may generate a control signal that causes the avatar to jump. The example system may adjust the avatar's movement based on the detected scene features. For example, if the scanning query detects an obstacle, the example system may adjust the avatar's movement to ensure that the avatar avoids the obstacle.

The example system may also provide feedback to the player based on the detected scene features and the recommended actions. In some cases, the example system displays information related to the detected scene features and the recommended actions on a display device. For example, the example system may display an icon indicating the presence of an obstacle in the avatar's path and a message indicating the recommended action to avoid the obstacle. The example system may also provide audio feedback to the player, such as a warning sound when an obstacle is detected.

In some embodiments, the example system may be integrated with a machine learning module that can learn from the player's actions and adjust the recommended actions accordingly. The machine learning module may analyze the player's behavior and performance and use this information to improve the mapping between the detected scene features and the recommended actions. For example, if the player consistently fails to avoid an obstacle using the recommended action, the machine learning module may adjust the recommended action to improve the player's performance.

In addition, the example system may be configured to work with different types of computer games, including first-person shooters, platformers, racing games, and more. The scanning queries and mapping rules may be adjusted to suit the specific requirements of each type of game. For example, in a racing game, the scanning queries may be used to detect upcoming turns or obstacles, and the recommended actions may include slowing down or swerving to avoid them. Similarly, in a first-person shooter game, the scanning queries may be used to detect enemy positions, and the recommended actions may include firing at the enemy or taking cover.

Moreover, the example system may be used in both single-player and multiplayer games. In multiplayer games, the example system may be configured to detect the presence of other players and adjust the recommended actions accordingly. For example, if the scanning query detects that another player is blocking the avatar's path, the mapping module may recommend that the avatar move to the side or jump over the player.

In some embodiments, the example system may be used in conjunction with virtual reality (VR) or augmented reality (AR) devices. The scanning queries may be used to detect features in the VR or AR environment, and the recommended actions may be adjusted to suit the specific requirements of the VR or AR game. For example, in a VR game, scanning queries may be used to detect obstacles in the avatar's physical environment, and the recommended actions may include physically moving the avatar and/or changing the avatar's posture to avoid the obstacles.

The techniques described herein enable multiple technical advantages. For example, mapping detected geometric features to recommended actions in real-time can enable assisted gameplay and improve the player's experience. By providing immediate feedback and guidance, the system can help the player to overcome obstacles and complete objectives more efficiently, leading to a more enjoyable and rewarding gaming experience.

As another example, the use of segment casts allows for efficient and scalable detection of geometric features in a target area of the virtual scene. Unlike a ray cast, which only returns a single intersection point, a segment cast can return all geometric information in a particular region, providing a more comprehensive representation of the scene. By using segment casts, a system can reduce the number of scanning queries needed to detect all relevant geometric features, thereby reducing the computational cost and improving the system's overall speed.

As a further example, using multiple scanning queries executed in parallel can further improve the computational efficiency and speed of the system. By dividing the scene into multiple virtual environment regions and generating scanning queries for each region, the system can detect a wide range of geometric features in real time. Using multiple execution threads to process these queries simultaneously can significantly reduce the time required for feature detection and mapping, improving the system's overall speed.

In some cases, by determining N segments in the virtual scene, the system can generate N segment casts, each covering a specific region of the scene. Each thread can then process its segment cast separately, using the same or different algorithms to detect and map the relevant scene features. This parallel processing approach can significantly reduce the time required for feature detection and mapping, enabling the system to operate in real-time. The use of multiple threads also allows the system to allocate system resources more efficiently, such as CPU cores and memory, to improve overall system performance. The parallel processing approach can be easily scaled up or down depending on the complexity of the virtual scene and the processing requirements of the system, making it a flexible and versatile solution for assisted gameplay in computer games.

Overall, the technical advantages of this invention include improved computational efficiency, faster processing speed, greater levels of scalability, and enhanced gameplay experience, making it a valuable tool for computer gaming applications.

In some cases, the techniques described herein enable assisted gameplay in real-time while the game is being played. This means that the system can detect and map scene features to recommended actions instantaneously as the player avatar moves through the virtual environment. The use of scanning queries, such as segment casts, may allow for fast and efficient detection of geometric features, which can be processed and mapped to recommended actions in real time. This real-time processing may ensure that the player receives immediate feedback and guidance, enabling them to make informed decisions and react quickly to changes in the game environment. The ability to provide assisted gameplay in real-time while the game is being played can significantly enhance the player's experience, making the game more engaging and enjoyable.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

FIG. 1 illustrates a schematic diagram of an example environment 100 with game system(s) 110 and game client device(s) 130. While the example environment 100 depicted in FIG. 1 includes multiple players, a person of ordinary skill in the relevant technology recognizes that the techniques described herein can also be used in a single-player environment.

The example environment 100 may include one or more player(s) 132(1), 132(2), 132(3), . . . 132(N), hereinafter referred to individually or collectively as player(s) 132, who may interact with respective game client device(s) 130(1), 130(2), 130(3), . . . 130(N), hereinafter referred to individually or collectively as game client device(s) 130 via respective input device(s).

The game client device(s) 130 may receive game state information from the one or more game system(s) 110 that may host the online game played by the player(s) 132 of environment 100. The game state information may be received repeatedly and/or continuously and/or as events of the online game transpire. The game state information may be based at least in part on the interactions that each of the player(s) 132 have in response to events of the online game hosted by the game system(s) 110.

The game client device(s) 130 may be configured to render content associated with the online game to respective player(s) 132 based at least on the game state information. More particularly, the game client device(s) 130 may use the most recent game state information to render current events of the online game as content. This content may include video, audio, haptic, combinations thereof, or the like content components.

As events transpire in the online game, the game system(s) 110 may update game state information and send that game state information to the game client device(s) 130. For example, if the player(s) 132 are playing an online soccer game, and the player 132 playing one of the goalies moves in a particular direction, then that movement and/or goalie location may be represented in the game state information that may be sent to each of the game client device(s) 130 for rendering the event of the goalie moving in the particular direction. In this way, the content of the online game is repeatedly updated throughout game play. Further, the game state information sent to individual game client device(s) 130 may be a subset or derivative of the full game state maintained at the game system(s) 110. For example, in a team deathmatch game, the game state information provided to a game client device 130 of a player may be a subset or derivative of the full game state generated based on the location of the player in the game simulation.

When the game client device(s) 130 receive the game state information from the game system(s) 110, a game client device 130 may render updated content associated with the online game to its respective player 132. This updated content may embody events that may have transpired since the previous state of the game (e.g., the movement of the goalie).

The game client device(s) 130 may accept input from respective player(s) 132 via respective input device(s). The input from the player(s) 132 may be responsive to events in the online game. For example, in an online basketball game, if a player 132 sees an event in the rendered content, such as an opposing team's guard blocking the point, the player 132 may use his/her input device to try to shoot a three-pointer. The intended action by the player 132, as captured via his/her input device, may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various player(s) 132 and update the state of the online game based thereon. As the state of the online game is updated, the state may be sent to the game client device(s) 130 for rendering online game content to player(s) 132. In this way, the game system(s) 110 may host the online game.

In some cases, the techniques described herein for detecting scene features and mapping scene features to recommended actions can be performed by the game system(s) 110. For example, the game system(s) 110 may be configured to generate a scanning query to determine a geometric feature in a virtual scene, determine a scene feature based on the geometric feature, map the scene feature to a recommended action, generate display data of the avatar performing the recommended action, and provide the display data to the game client device(s) 130. The game client device(s) 130 may then be configured to display the display data to the player.

In some cases, the techniques described herein for detecting scene features and mapping scene features to recommended actions can be performed by the game client device(s) 130. For example, a game client device may be configured to receive data describing a virtual scene from the game system(s) 110. Afterward, the game client device(s) 130 may be configured to generate a scanning query to determine a geometric feature in the received virtual scene, determine a scene feature based on the geometric feature, map the scene feature to a recommended action, and display the avatar performing the recommended action to the player.

Figure 2:
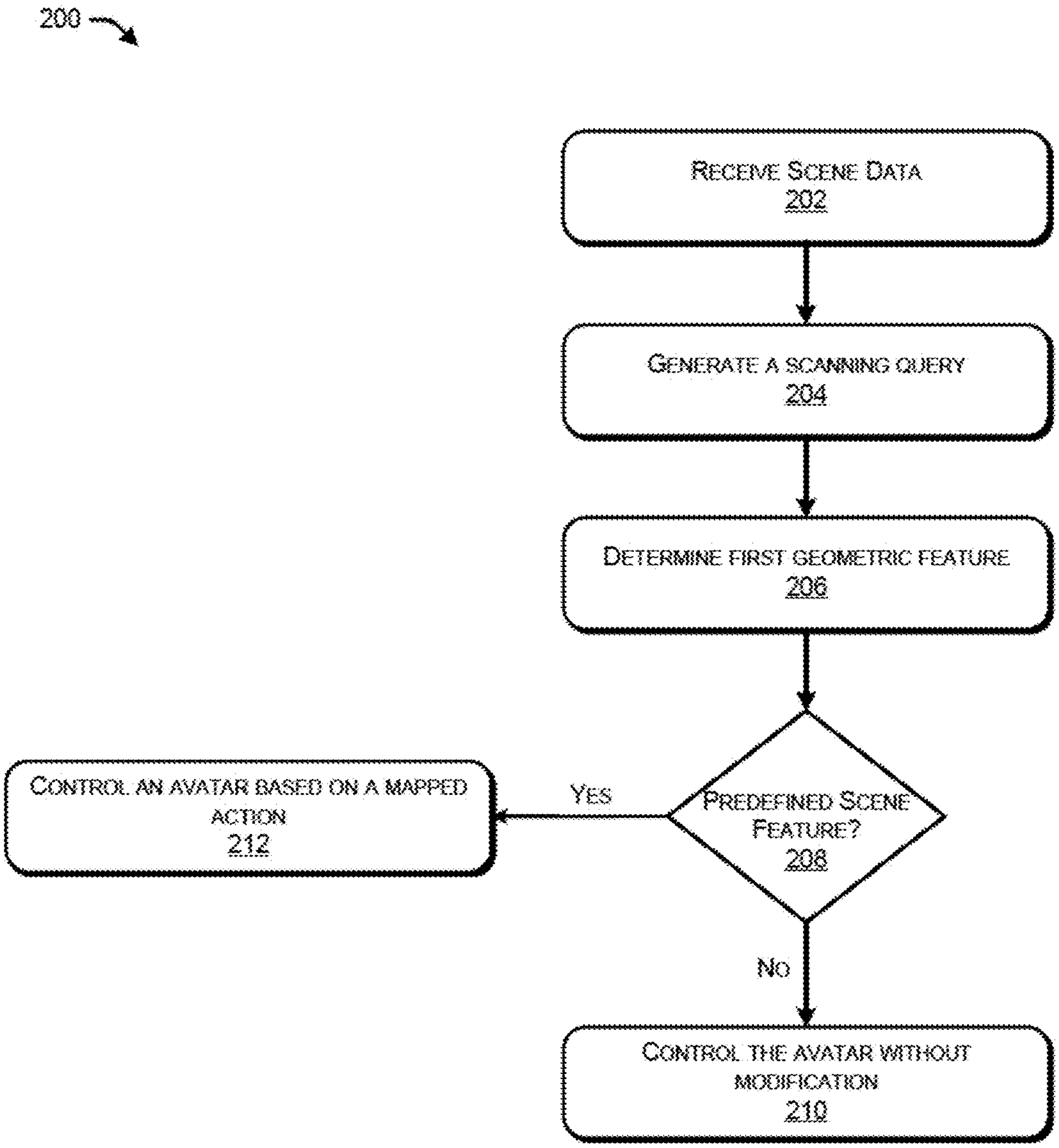
FIG. 2 is a flowchart diagram of an example process for controlling a player avatar based on received scene data for a virtual scene.

FIG. 2 is a flowchart diagram of an example process 200 for controlling a player avatar based on received scene data for a virtual scene. As depicted in FIG. 2, at operation 202, the process 200 includes receiving scene data for a virtual scene.

The virtual scene may be a digital environment created using computer graphics operations. The virtual scene may be rendered in real-time and displayed on a screen or other output device to give the player a visual representation of the game world. The virtual scene may include various elements such as terrain, objects, characters, and other interactive elements with which the player can interact. The virtual scene may also include lighting, sound effects, and other immersive features that enhance the player's experience.

In some cases, the virtual scene is a simulated three-dimensional digital environment. The virtual scene may include objects, characters, and landscapes designed to create an immersive gaming experience for the player. The virtual scene may also include interactive elements that allow the player to interact with the environment and affect the game's outcome. The virtual scene may be rendered in real-time using advanced graphics processing techniques, allowing the player to move and interact with the environment seamlessly and responsively.

At operation 204, the process 200 includes generating a scanning query toward a first target area of the virtual scene. An example of a scanning query is a segment cast that can return all the geometric information in a specific region of the virtual scene.

In some cases, the system can generate multiple segment casts, each cast towards a respective target area within the virtual scene. For instance, the first segment cast can capture geometric features corresponding to the region parallel to the head of the player avatar while standing straight, and the second segment cast can capture features corresponding to the ground level when the avatar is on the ground. The example system can execute these two threads in parallel to enable faster processing.

In some cases, the system can generate multiple scanning queries, each returning geometric feature data associated with a respective region of the virtual scene. For instance, a first scanning query can return geometric feature data associated with a region parallel to the player avatar's head. A second scanning query can return geometric feature data associated with a region parallel to the player's avatar feet. These scanning queries can return geometric feature data representing the detected presence of a particular geometric shape and/or a transition in the ground level of the virtual scene.

In some cases, the scanning query includes a segment cast associated with a plurality of dimensions, and the first target area is determined based on the plurality of dimensions and with reference to a vantage point associated with the virtual scene. In some cases, the segment cast is a two-dimensional segment cast with a time dimension and a half axis dimension. In some cases, the segment cast is a three-dimensional segment cast with a time dimension, a half axis dimension, and a height extrusion axis dimension.

In some cases, the first target area associated with the scanning query includes at least a portion of a line of sight of the avatar when the line of sight is substantially parallel to the ground level. In some cases, the first target area associated with the scanning query includes at least a portion of the ground level of the virtual scene.

In some cases, the scanning query includes at least one of a ray cast, a collection of ray casts, or a segment cast. A ray cast may involve casting a straight line in a particular direction from an initial point in the virtual scene. A collection of ray casts may involve casting multiple rays in different directions from an initial point in the virtual scene. A segment cast may include scanning a particular region of the virtual scene for all geometric information.

In some cases, generating the scanning query may include at least one of a voxel traversal or a hierarchical traversal. Voxel traversal may involve dividing the virtual scene into a grid of voxels (3D pixels) and scanning each voxel to detect any objects or obstacles present in that location. Hierarchical traversal may involve dividing the virtual scene into smaller regions and scanning each region for objects or obstacles At operation 206, the process 200 includes determining a first geometric feature based on the output data returned by the scanning query. An example of a geometric feature that the scanning query could return is the height of the terrain or objects within the scanned region. An example of a geometric feature that the scanning query could return is the orientation of a surface, such as whether the described surface is sloped or flat. The scanning query could also return information related to the texture or material properties of one or more objects in the scanned region. In some cases, the first geometric feature is determined based on the intersection of a plane associated with a segment cast and an object in the first target area.

At operation 208, the process 200 includes determining whether the first geometric feature represents a predefined scene feature. Examples of predefined scene features include obstacles (e.g., obstacles in a region within the predicted trajectory of the avatar that is substantially aligned with a head of the avatar while the avatar is in an upright position) and transitions in a ground level of the virtual scene.

Geometric features in a virtual scene that indicate a transition in the ground level typically may involve changes in elevation or curvature of the terrain. For example, if the ground level in front of the avatar suddenly becomes significantly steeper, it may indicate the presence of a transition in the ground level. Such steepness change detections can be used to detect hills or slopes that the avatar should optimally climb or descend. As another example, if the ground level in front of the avatar changes in curvature, it may indicate the presence of a transition in the ground level. Such curvature change detections can detect bumps or ridges in the terrain that the avatar should optimally navigate.

In some cases, if the virtual scene includes a staircase that the avatar must ascend or descend, it may indicate the presence of a transition in the ground level. Such staircase detections can be used to detect indoor or outdoor staircases that the avatar should optimally climb or descend.

In some cases, the presence of a transition in the ground level may be indicated by visual cues such as a change in texture or color of the terrain. Such visual cues can be used to detect changes in terrain such as rocky areas or sand dunes.

At operation 210, the process 200 includes controlling the player avatar without any modifications based on (e.g., in response to) determining that the first geometric feature does not represent a predefined scene feature. In some cases, based on (e.g., in response to) determining that the first geometric feature does not represent a predefined scene feature, the system controls the player avatar based on player input without any modifications. Accordingly, the system may skip modifying the avatar actions/movements based on mapping predefined scene features to recommended actions.

At operation 212, the process 200 includes controlling the player avatar by modifying the avatar movements based on a recommended action mapped to the predefined scene feature. In some cases, based on (e.g., in response to) determining that the first geometric feature represents a predefined scene feature, the system modifies the actions of the avatar based on the recommended action associated with the predefined scene feature.

For example, if the predefined scene feature is a head-level obstacle, the system may control the avatar by causing the avatar to be in a lowered head (e.g., crouch) position even if the player does not provide input data (e.g., does not perform actions) configured to lower the avatar's head. As another example, if the predefined scene feature is a ground-level transition (e.g., a hill, a downhill, a hole, a staircase, and/or the like), the system may control the avatar by causing the avatar to adjust its movement direction after the transition to reduce or eliminate the effect of the transition on the avatar's direction.

In some cases, the first target area comprises at least a portion of a line of sight of the avatar when the line of sight is substantially parallel to the ground level. In some cases, the first predefined scene feature includes a first obstacle. In some cases, controlling the avatar based on the recommended action includes automatically causing the avatar to transition to a posture configured to avoid collision between the avatar and the first obstacle. In some cases, the first target area is determined based on a region that includes at least a portion of the ground level of the virtual scene. In some cases, the first predefined scene feature includes a first ground-level transition. In some cases, controlling the avatar based on the recommended action includes automatically adjusting the orientation of the avatar (e.g., to adjust the effect of the transition on the direction of movement associated with the avatar).

Figure 3A:
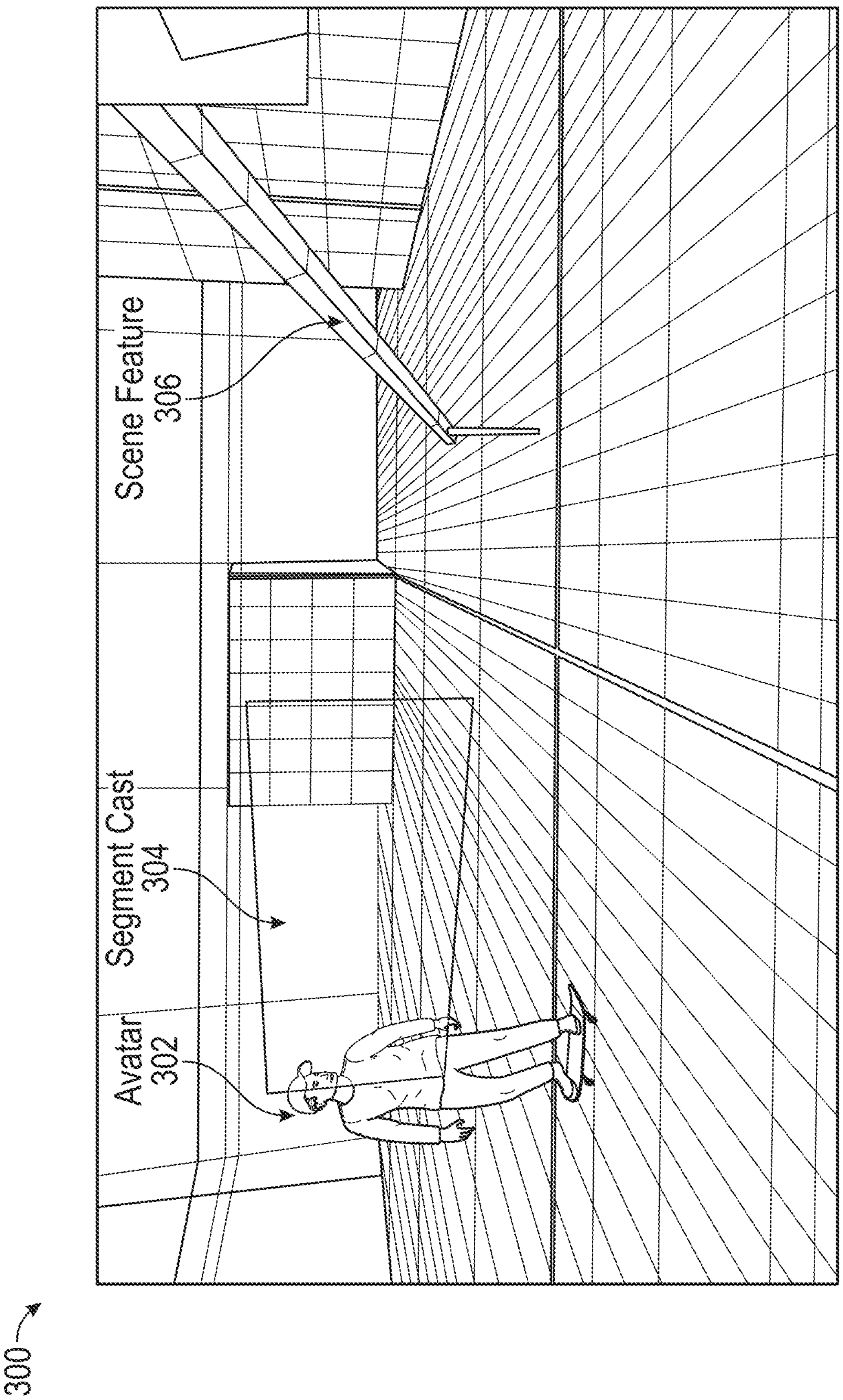
FIGS. 3A-3B provide an operational example of detecting a scene feature that corresponds to a head-level obstacle.
Figure 3B:
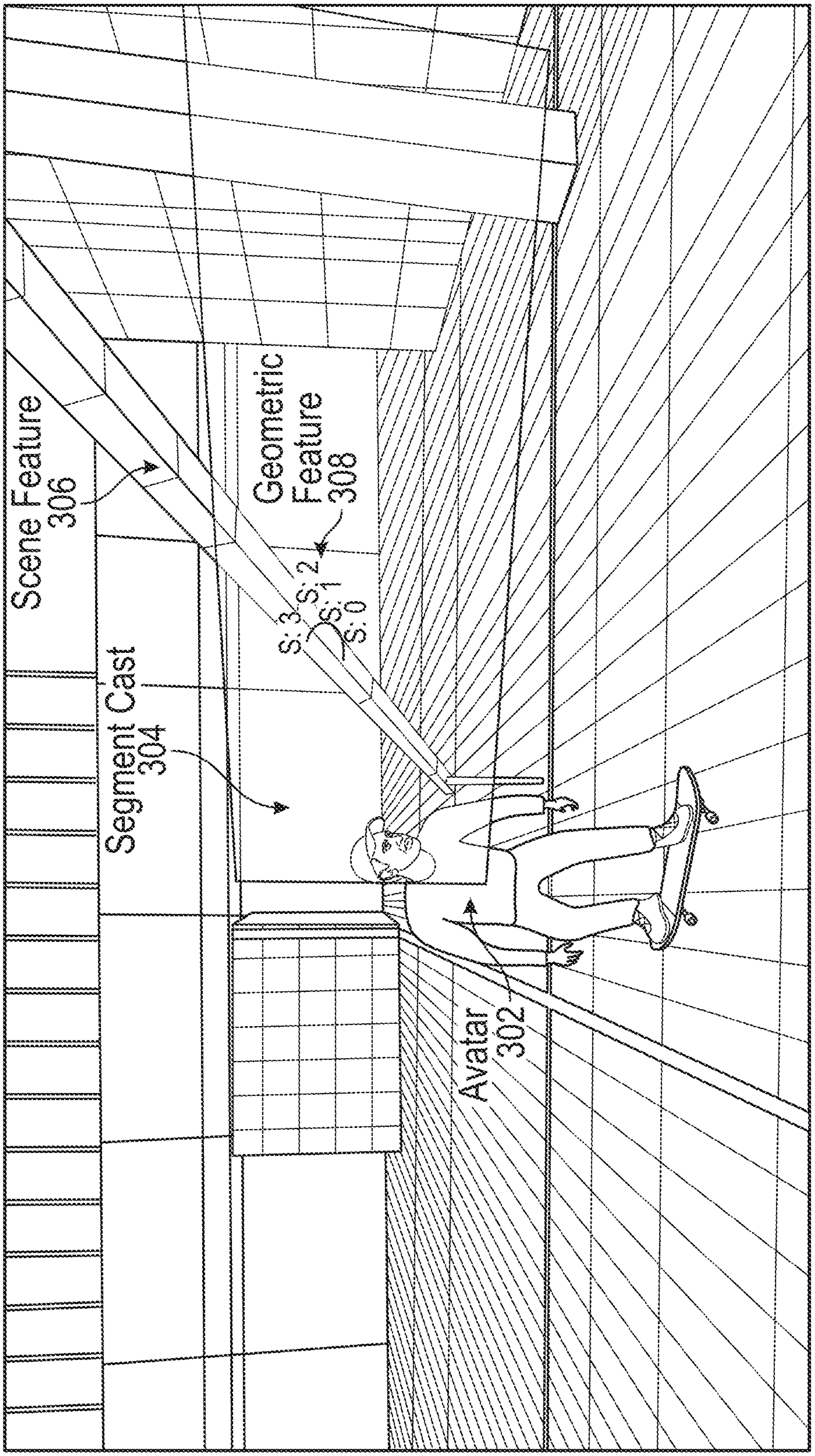

FIGS. 3A-3B provide an operational example of detecting a scene feature 306 that is a head-level obstacle. As depicted in FIG. 3A, while the avatar 302 is moving in the virtual scene 300, the system generates a segment cast 304. At the time associated with FIG. 3A, the segment cast 304 does not capture geometric feature data that represents the presence of scene feature 306. However, at the time associated with FIG. 3B, the segment cast 304 captures the geometric feature 308, representing the presence of the scene feature 306. Accordingly, detection of scene feature 306 causes the system to control the avatar 302 by automatically lowering the avatar's head.

Figure 4:
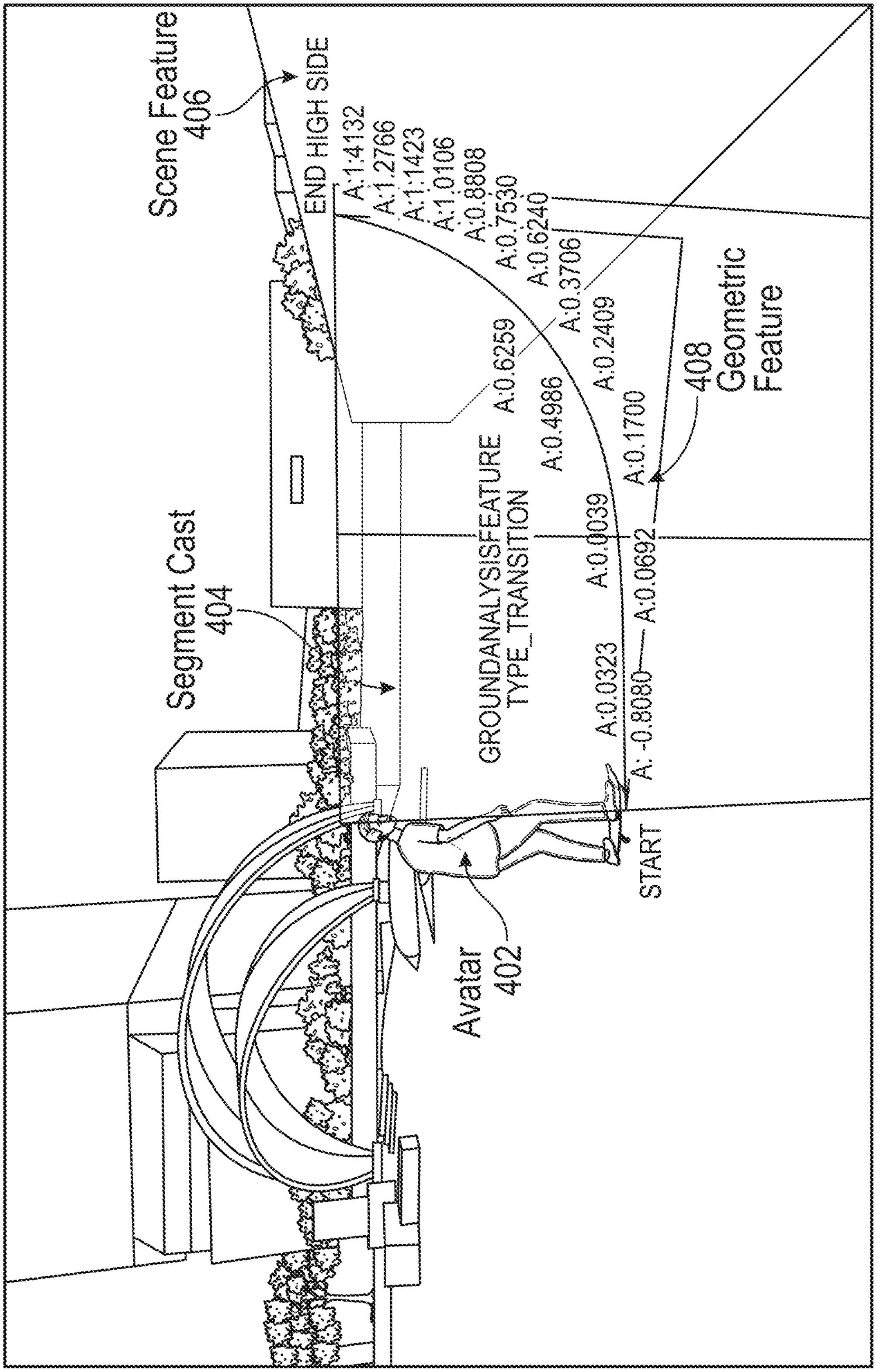
FIG. 4 provides an operational example of detecting a scene feature that corresponds to a ramp.

FIG. 4 provides an operational example of detecting a scene feature 406 that corresponds to a ramp. A ramp may be a type of transition in the ground level of the virtual scene 400. As depicted in FIG. 4, the segment cast 404 captures the geometric feature 408, representing the presence of the scene feature 406 in the virtual scene 400. Accordingly, the system controls the avatar 402 to adjust the direction of the avatar 402 after the avatar jumps through the ramp.

Figure 5:
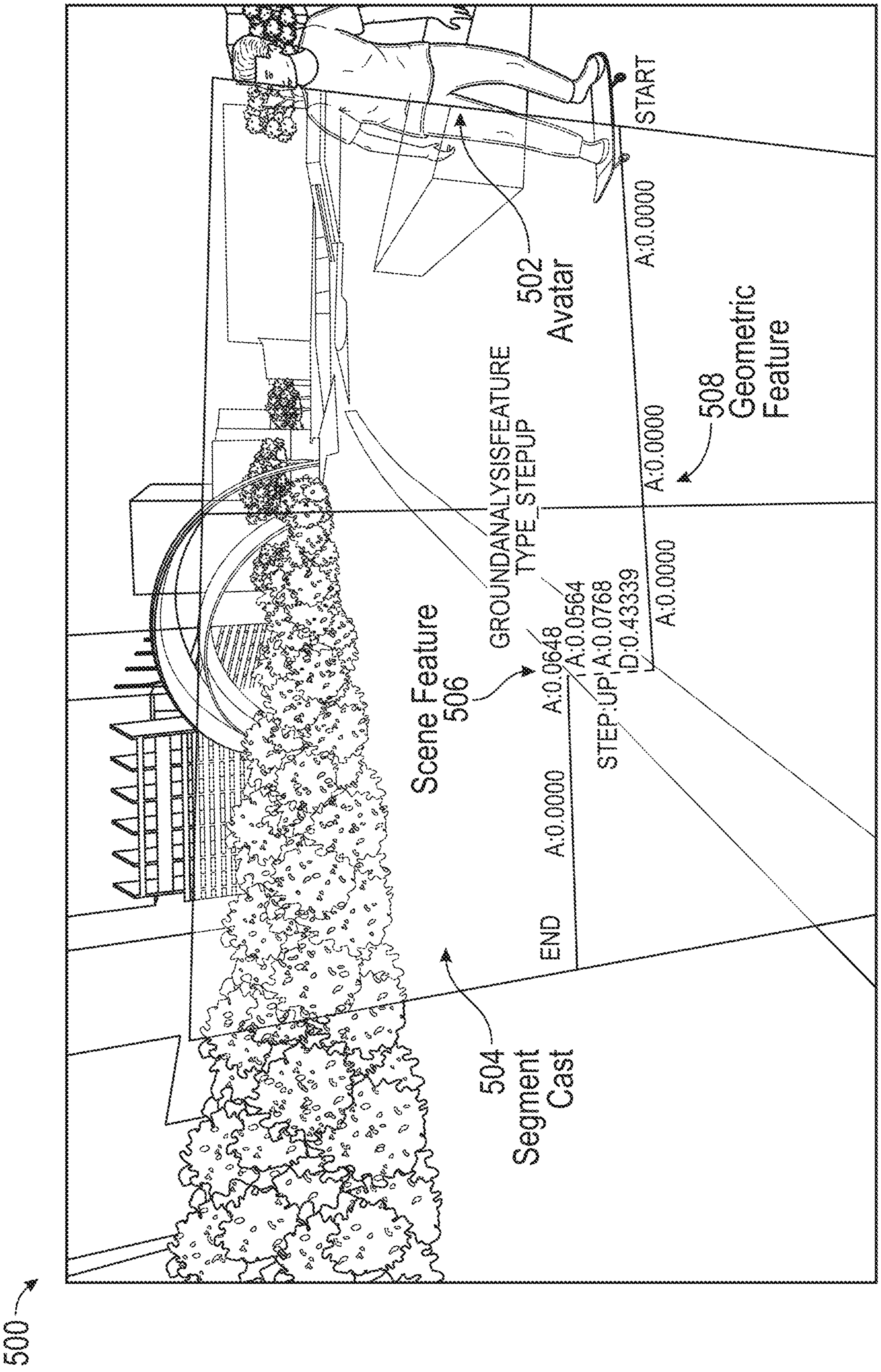
FIG. 5 provides an operational example of detecting a scene feature that corresponds to a stairstep.

FIG. 5 provides an operational example of detecting a scene feature 506 that corresponds to a stairstep. A stairstep may be a type of transition in the ground level of the virtual scene 500. As depicted in FIG. 5, the segment cast 504 captures the geometric feature 508, representing the presence of the scene feature 506 in the virtual scene 500. Accordingly, the system controls the avatar 502 to adjust the direction of the avatar 502 after the avatar goes up the stairstep.

Figure 6:
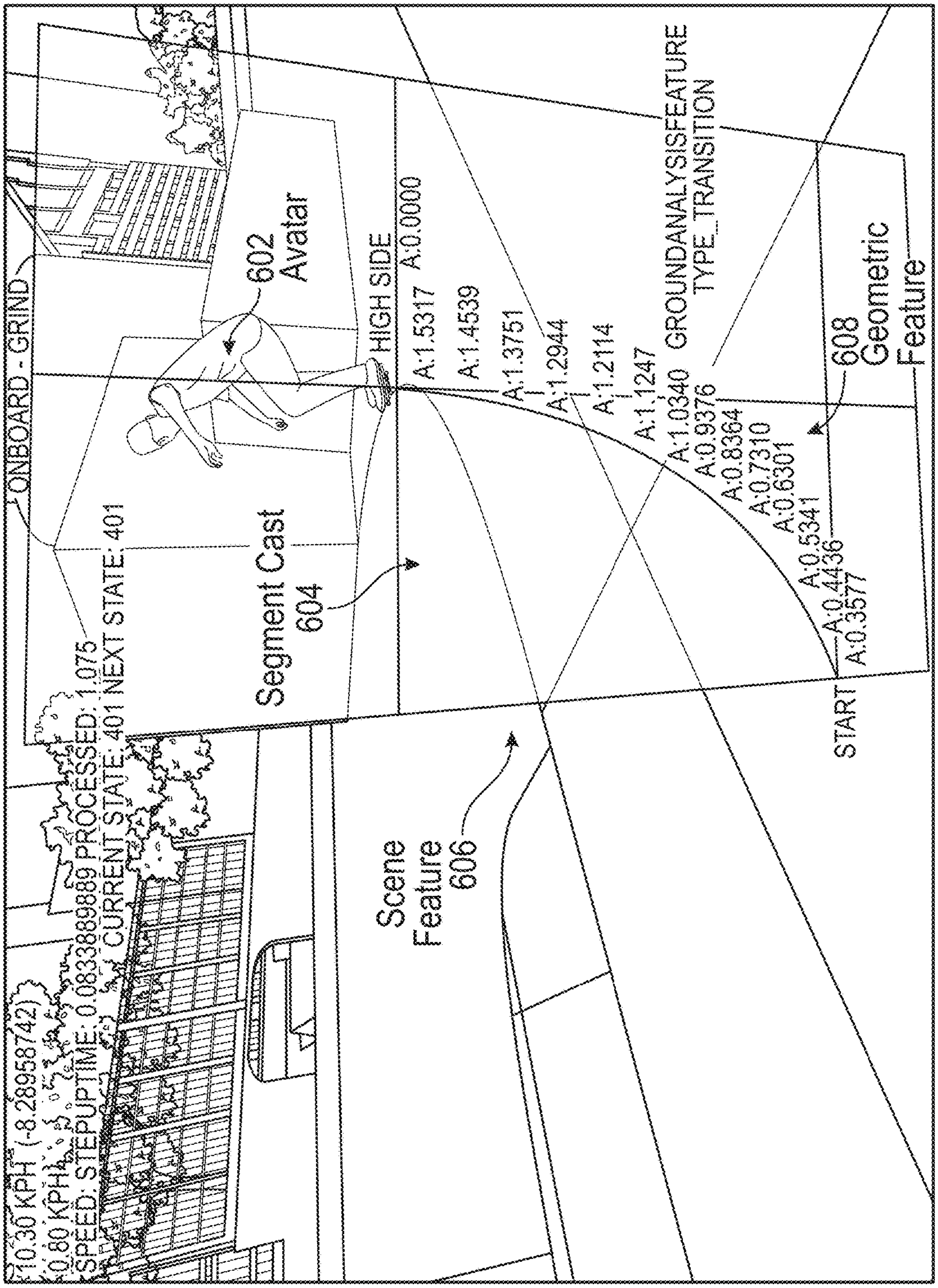
FIG. 6 provides an operational example of detecting a scene feature that corresponds to a skating bowl.

FIG. 6 provides an operational example of detecting a scene feature 606 that corresponds to a skating bowl. A skating bowl may be a type of transition in the ground level of the virtual scene 600. As depicted in FIG. 6, the segment cast 604 captures the geometric feature 608, representing the presence of the scene feature 606 in the virtual scene 600. Accordingly, the system controls the avatar 602 to adjust the direction of the avatar 602 after the avatar goes down the skating bowl.

Figure 7:
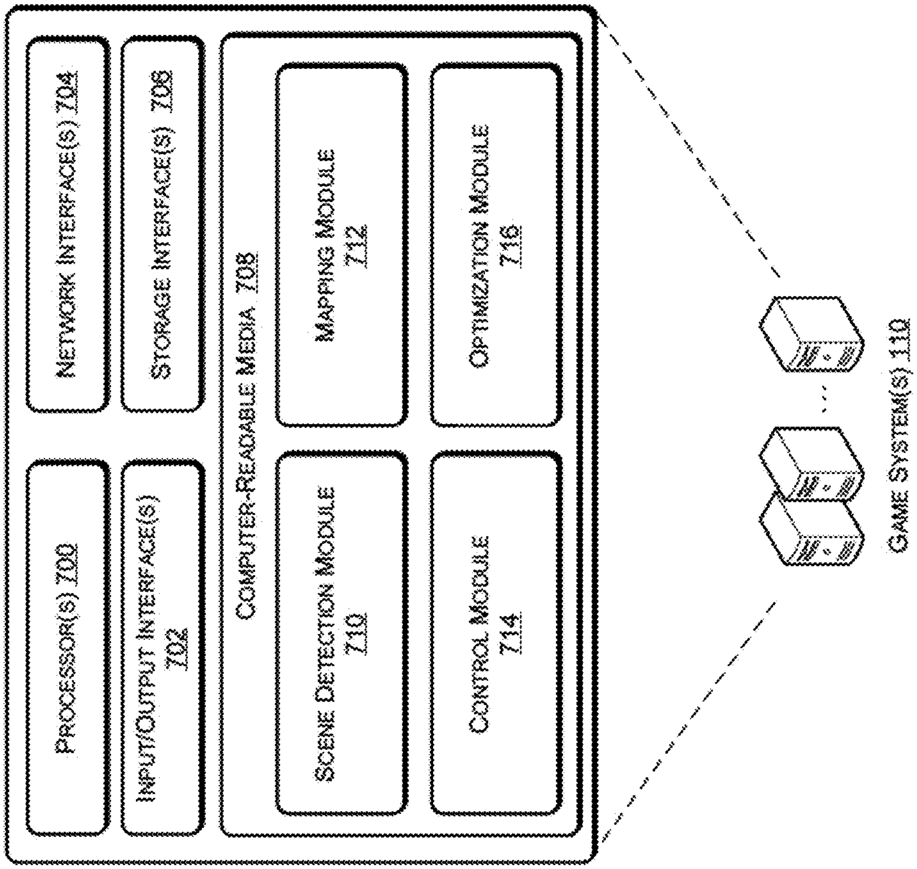
FIG. 7 illustrates a block diagram of example game system(s) that may provide assisted gameplay in accordance with examples of the disclosure.

FIG. 7 illustrates a block diagram of example game system(s) 110 that may provide assisted gameplay in accordance with examples of the disclosure. The game system(s) 110 may include one or more processor(s) 700, one or more input/output (I/O) interface(s) 702, one or more network interface(s) 704, one or more storage interface(s) 706, and computer-readable media 708.

In some implementations, the processor(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the game system(s) 110 to detect interaction with a user and/or other system(s), such as one or more game system(s) 110. The I/O interface(s) 702 may include a combination of hardware, software, and/or firmware and may include software drivers for enabling the operation of any variety of I/O device(s) integrated on the game system(s) 110 or with which the game system(s) 110 interacts, such as displays, microphones, speakers, cameras, switches, and any other variety of sensors, or the like.

The network interface(s) 704 may enable the game system(s) 110 to communicate via the one or more network(s). The network interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the game system(s) 110 to transition between various standards. The network interface(s) 704 may further enable the game system(s) 110 to communicate over circuit-switch domains and/or packet-switch domains.

The storage interface(s) 706 may enable the processor(s) 700 to interface and exchange data with the computer-readable medium 708, as well as any storage device(s) external to the game system(s) 110.

The computer-readable media 708 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 708 may be implemented as computer-readable storage media (CRSM), which may be any available physical media accessible by the processor(s) 700 to execute instructions stored on the computer readable media 708. In one basic implementation, CRSM may include RAM and Flash memory. In other implementations, CRSM may include, but is not limited to, ROM, EEPROM, or any other tangible medium which can be used to store the desired information and which can be accessed by the processor(s) 700. The computer-readable media 708 may have an operating system (OS) and/or a variety of suitable applications stored thereon. The OS, when executed by the processor(s) 700 may enable management of hardware and/or software resources of the game system(s) 110.

Several functional blocks having instruction, data stores, and so forth may be stored within the computer-readable media 708 and configured to execute on the processor(s) 700. For example, the scene detection module 710 may be configured to detect predefined scene features in real-time by generating scanning queries, such as segment casts, and mapping them to recommended actions. The scene detection module 710 may use computer graphics operations to determine the geometric features associated with objects in the virtual scene and analyze them to determine the presence of obstacles, transitions in the ground level, and/or other relevant scene features.

The mapping module 712 may be configured to map the detected scene features to recommended actions based on predefined rules and algorithms. The mapping module 712 may map scene features to actions based on a set of predefined features. The mapping module 712 may map scene features to actions based on the player's current position, velocity, and other contextual information to provide appropriate guidance and feedback. The mapping module 712 may use real-time data from the scene detection module to generate recommendations that enable the player avatar to overcome obstacles and complete objectives more efficiently.

The control module 714 may be configured to control the player avatar based on the recommended actions generated by the mapping module. The control module 714 may interface with the game engine to modify the player's movement, actions, and interactions with the virtual environment. The control module 714 may ensure that the player avatar follows the recommended actions and avoids obstacles, transitions, and other hazards detected by the scene detection module.

The optimization module 716 may be configured to allocate resources between different scanning queries that are executed in parallel. For example, the optimization module 716 may be configured to adjust the number of execution threads used for each scanning query based on the computational complexity of the query and the current workload of the system. If a particular scanning query is more computationally intensive than others, the optimization module 716 may allocate additional execution threads to that query to ensure that it completes in a timely manner. Conversely, if a scanning query is less complex, the optimization module 716 may allocate fewer execution threads to that query to conserve computational resources. In addition, the optimization module 716 may monitor the performance of the system during gameplay and adjust resource allocation dynamically to ensure optimal performance.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:

one or more processors; and one or more computer-readable media storing computer-executable instructions that, when executed by the one or more processors, cause the one or more processors to perform operations comprising:

generating a first scanning query toward a first target area within a virtual scene, wherein generating the first scanning query comprises casting a plane having two or more dimensions;

determining, based on the first scanning query, a first geometric feature associated with the first target area;

determining, based on the first geometric feature, that the first target area comprises a first predefined scene feature, wherein the first predefined scene feature comprises at least one of a first obstacle within a predicted trajectory of an avatar in the virtual scene or a first transition in a ground level of the virtual scene; and based on determining that the first target area comprises the first predefined scene feature, controlling the avatar in the virtual scene based at least in part on a first action associated with the first predefined scene feature.

2. The system of claim 1, wherein:
the first scanning query comprises a segment cast associated with a plurality of dimensions, and
the first target area is determined based on the plurality of dimensions and in relation to a vantage point associated with the virtual scene.

3. The system of claim 2, wherein the segment cast is a two-dimensional segment cast with a time dimension and a half axis dimension.

4. The system of claim 2, wherein the segment cast is a three-dimensional segment cast with a time dimension, a half axis dimension, and a height extrusion axis dimension.

5. The system of claim 1, the operations further comprising:
determining a first line segment based on the plane, wherein the first line segment is associated with a collision between the plane and an object in the virtual scene; and
determining the first geometric feature based on the first line segment.

6. The system of claim 1, wherein:
the first target area comprises at least a portion of a line of sight of the avatar when the line of sight is substantially parallel to the ground level,
the first predefined scene feature comprises the first obstacle; and
controlling the avatar based on the first action comprises automatically causing the avatar to transition to a posture that is configured to avoid collision between the avatar and the first obstacle.

7. The system of claim 1, the operations further comprising:
generating a second scanning query toward a second target area within the virtual scene;
determining, based on the second scanning query, a second geometric feature associated with the second target area;
determining, based on the second geometric feature, that the second target area comprises a second predefined scene feature, wherein the second predefined scene feature comprises at least one of a second obstacle within the predicted trajectory of the avatar in the virtual scene or a second transition in the ground level of the virtual scene; and
based on determining that the second target area comprises the second predefined scene feature, controlling the avatar in the virtual scene based at least in part on a second action associated with the second predefined scene feature.

8. The system of claim 7, wherein:
the second target area is determined based on a region that comprises at least a portion of the ground level,
the second predefined scene feature comprises the second transition, and
controlling the avatar based on the second action comprises automatically adjusting an orientation of the avatar to adjust an effect of the second transition on a direction of movement associated with the avatar.

9. The system of claim 7, wherein:
the first scanning query is generated by a first execution thread, and
the second scanning query is generated by a second execution thread that is executed in parallel with the first execution thread.

10. The system of claim 7, wherein the second predefined scene feature comprises at least one of a staircase, a hill, or a downhill.

11. The system of claim 1, wherein:
the virtual scene is associated with a computer game;
the operations comprise determining, based on an input associated with a player of the computer game, a trajectory associated with an avatar in the virtual scene, and
controlling the avatar based on the first action comprises controlling the avatar based on the trajectory and the first action.

12. A computer-implemented method comprising:
generating, by a processor, a first scanning query toward a first target area within a virtual scene, wherein generating the first scanning query comprises casting a plane having two or more dimensions;
determining, by the processor and based on the first scanning query, a first geometric feature associated with the first target area;
determining, by the processor and based on the first geometric feature, that the first target area comprises a first predefined scene feature, wherein the first predefined scene feature comprises at least one of a first obstacle within a predicted trajectory of an avatar in the virtual scene or a first transition in a ground level of the virtual scene; and
based on determining that the first target area comprises the first predefined scene feature, controlling the avatar in the virtual scene based at least in part on a first action associated with the first predefined scene feature.

13. The computer-implemented method of claim 12, wherein:
the first scanning query comprises a segment cast associated with a plurality of dimensions, and
the first target area is determined based on the plurality of dimensions and in relation to a vantage point associated with the virtual scene.

14. The computer-implemented method of claim 13, wherein the segment cast is a two-dimensional segment cast with a time dimension and a half axis dimension.

15. The computer-implemented method of claim 13, wherein the segment cast is a three-dimensional segment cast with a time dimension, a half axis dimension, and a height extrusion axis dimension.

16. The computer-implemented method of claim 12, further comprising:
determining, by the processor, a first line segment based on the plane, wherein the first line segment is associated with a collision between the plane and an object in the virtual scene; and
determining, by the processor, the first geometric feature based on the first line segment.

17. One or more non-transitory computer-readable media storing computer-executable instructions that, when executed by one or more processors, cause the one or more processors to perform operations comprising:
generating a first scanning query toward a first target area within a virtual scene, wherein generating the first scanning query comprises casting a plane having two or more dimensions;
determining, based on the first scanning query, a first geometric feature associated with the first target area;

determining, based on the first geometric feature, that the first target area comprises a first predefined scene feature, wherein the first predefined scene feature comprises at least one of a first obstacle within a predicted trajectory of an avatar in the virtual scene or a first transition in a ground level of the virtual scene; and based on determining that the first target area comprises the first predefined scene feature, controlling the avatar in the virtual scene based at least in part on a first action associated with the first predefined scene feature.

18. The one or more non-transitory computer-readable media of claim 17, wherein:

the first scanning query comprises a segment cast associated with a plurality of dimensions, and the first target area is determined based on the plurality of dimensions and in relation to a vantage point associated with the virtual scene.

19. The one or more non-transitory computer-readable media of claim 18, wherein the segment cast is a three-dimensional segment cast with a time dimension, a half axis dimension, and a height extrusion axis dimension.

20. The one or more non-transitory computer-readable media of claim 17, the operations further comprising:

determining a first line segment based on the plane, wherein the first line segment is associated with a collision between the plane and an object in the virtual scene; and determining the first geometric feature based on the first line segment.

* * * * *